April 17, 1928. 1,666,390
D. MARLEY
VEHICLE BRAKE SYSTEM
Filed Nov. 16, 1923  2 Sheets-Sheet 1
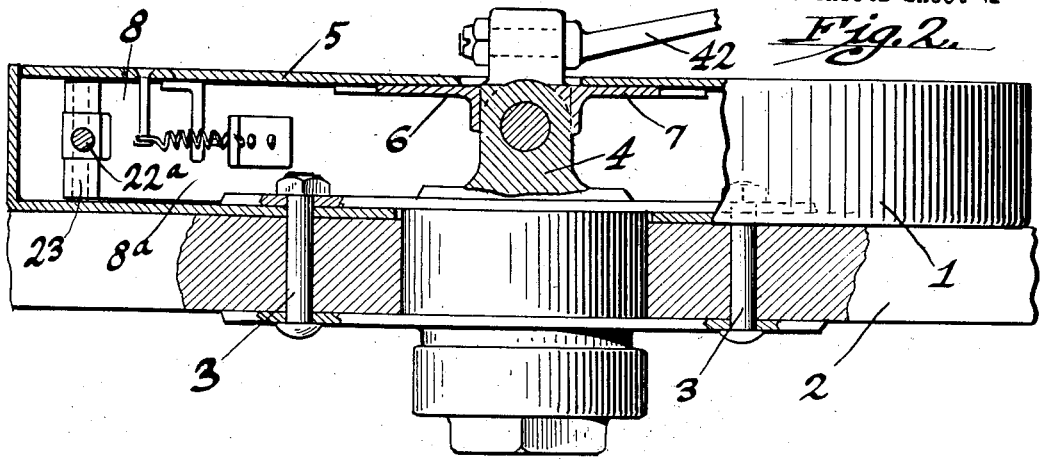
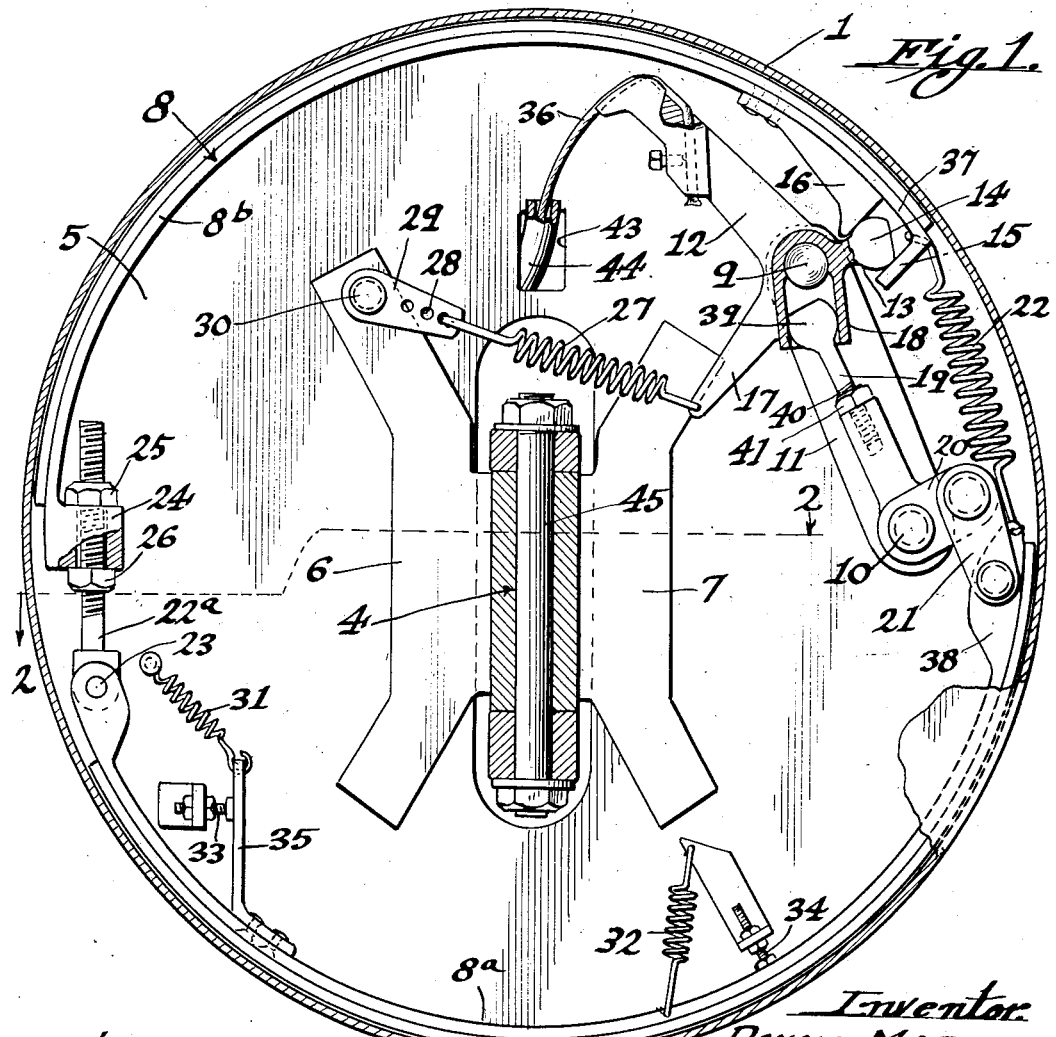
Inventor
Donald Marley
By Hazard and Miller
Attorneys
Witness April 17, 1928.  D. MARLEY  1,666,390
VEHICLE BRAKE SYSTEM
Filed Nov. 16, 1923  2 Sheets-Sheet 2
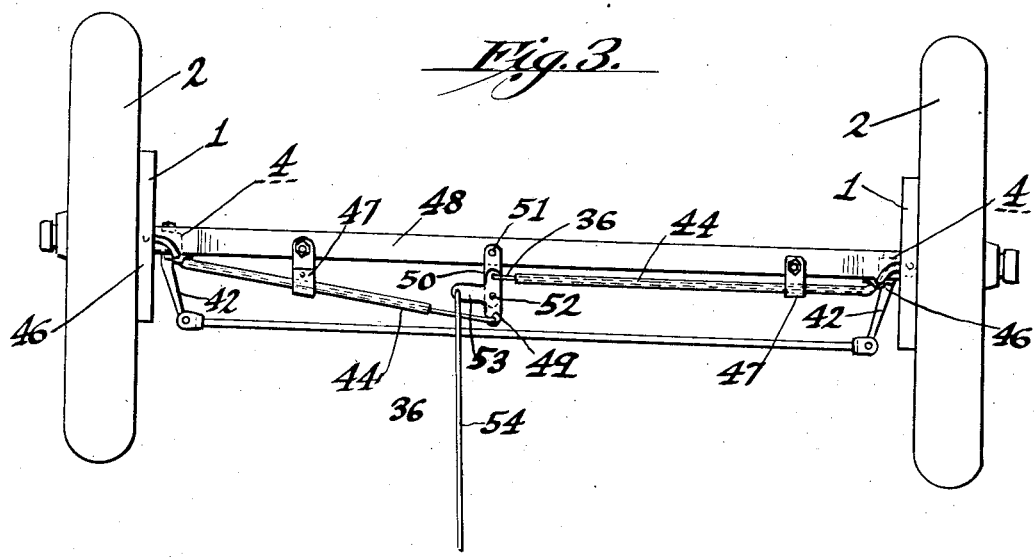
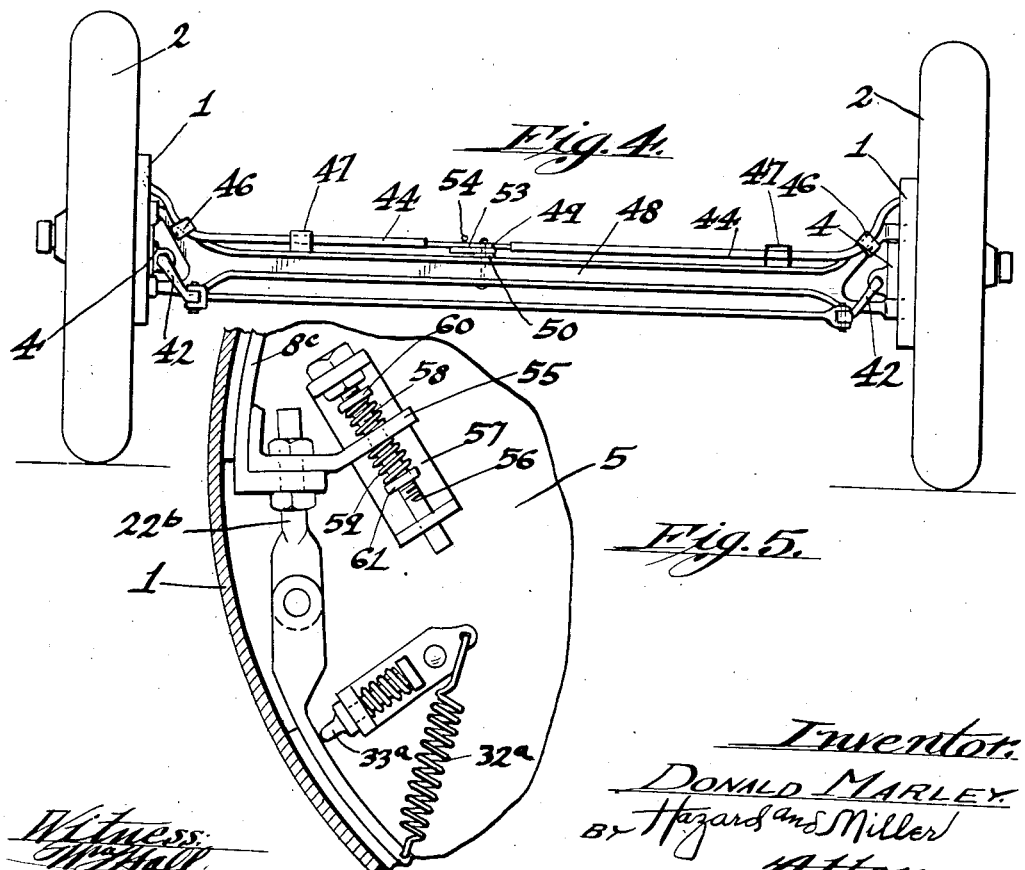

Patented Apr. 17, 1928.

1,666,390

UNITED STATES PATENT OFFICE.

DONALD MARLEY, OF LOS ANGELES, CALIFORNIA.

VEHICLE BRAKE SYSTEM.

Application filed November 16, 1923. Serial No. 675,104.

Although my present invention is referred to as a vehicle brake system, it should be understood that it is a primary object of this invention to provide a novel and highly efficient brake suitable for use upon the front wheels of motor vehicles, and especially suitable for prompt and economical installation on the front wheels of vehicles not originally provided with brakes, or the condition or character of whose brakes may justify replacement.

It is an object of this invention to provide a brake of comparatively simple construction comprising an interior brake band carrying a suitable lining and supported by a plate fixed relatively to a spindle casting, said brake band being secured at its ends to arms upon a pair of interconnected levers, the power arms of which levers may advantageously differ or vary in length in a manner compensatory of the torque effect initially produced upon the application of my novel brake, and, in a preferred embodiment of my invention, as utilized in a braking system, I may provide the respective brakes of the front wheels of a vehicle with interconnecting means whereby a strain resulting from the effective engagement of one brake may be promptly transmitted to and equalized in the application of the brake upon an opposite wheel, in a manner and by means hereinafter described.

It is an object of this invention to provide an interior band brake adapted to cooperate with a drum fixed upon a ground wheel and comprising two levers adapted to contribute unequally to an expansive movement of the respective ends of said brake band, that lever which must act against the torque produced by the application of the brake being provided with a power arm sufficiently elongated to enable it to operate at a correspondingly greater mechanical advantage and in such manner that an initial frictional engagement of a brake band may be regarded as opposing the prompt completion of its application, so that, in a preferred embodiment of my invention, the rapidity of rotation of one ground wheel may contribute to an immediate and complete braking action effective first upon that wheel which may be in the more rapid rotation or whose frictional surface may at the moment be in the better condition, and then upon the opposite wheel of a pair of front or other ground wheels interconnected in a manner hereinafter described.

It is a further object of this invention to provide a brake organization adapted to be installed upon ordinary vehicles provided with stub axles, or the like, by the securing thereto of a suitably apertured plate, preferably provided with engaging means such as angle-irons adjacent a spindle opening, this plate being equipped with a brake band and with operating parts adapted to cooperate in the production of a braking effect upon a drum independently mounted upon the inner face of a corresponding wheel; and, in a preferred embodiment of my invention, the operating means therefor may comprise not only a pair of levers supported upon each dust plate of the character referred to and inter-connected by means comprising a head upon one lever arm movable within a sleeve upon another lever arm, but also a flexible element extending from one of the two levers in each drum and through an opening in a dust plate into engagement with an intermediate lever plate which may be pivoted to an axle by means comprising a link permitting of an equalizing action between the respective brakes of a pair of wheels,—retracting and guiding or positioning means for each brake band being either of a usual design or of the specific construction hereinafter described.

Other objects of my invention will appear from the following description of a preferred embodiment thereof, and from the appended claims, taken in connection with the accompanying somewhat diagrammatic drawings, in which:

Figure 1 is an elevational view of an embodiment of so much of my novel braking organization as might be seen upon the cutting through the brake drum of a front wheel, and looking toward the longitudinal axis of the vehicle.

Fig. 2 is a horizontal sectional view substantially on the line 2—2 of Figure 1.

Figs. 3 and 4 are, respectively, plan and elevational views of a front axle and associated parts showing a preferred mode of obtaining an equalizing effect between the respective brakes upon a pair of front wheels.

Fig. 5 exhibits alternative details hereinafter referred to.

Referring to the details of that specific embodiment of my invention which I have chosen for purposes of illustration, 1 may be a brake drum, shown in Figure 2 as secured to a wheel 2 by means of bolts 3, this wheel being mounted for rotation upon a stub axle integral with a spindle casting 4, to which I may secure a dust plate 5 in any suitable way, as by means of angle irons 6, 7, which may be respectively welded or otherwise rigidly and permanently secured in such manner as to permit the supporting of essential operating parts of my novel brake from said dust plate.

Within the drum 1 I may provide a brake band 8, normally retracted therefrom, but provided at its respective ends with means for producing a relative expansion, my preferred means for the production of this expansion being a pair of levers shown as pivoted respectively upon pins 9 and 10, which may optionally be integral with a plate 11, predetermining the distance therebetween, or otherwise rigidly secured to the dust plate 5, the first of the mentioned levers comprising not only an operating or power arm 12 and a comparatively short work arm 13 terminating in a head 14, movably pivoted within a retaining means such as an aperture or slot formed by the cooperating projections 15 and 16, integral with or secured to the brake band 8, but also optionally a retracting arm 17, and a fourth arm 18, adapted to cooperate with an interfitting arm 19 of the second mentioned lever, the latter being shown as pivoted upon the pin 10 and as comprising a work arm 20, connected by a pivoted link 21 with the opposite end of the brake band 8,—the two ends of the said brake band being optionally additionally interconnected by resilient contracting means such as the spring 22.

Although the brake band 8 may optionally be formed integral, I have shown the same as formed, in a known manner, of two sections secured together by adjusting means, adapted to compensate for wear, and comprising a bolt 22$^a$, pivoted at 23 to one end of the brake band section 8$^a$, the bolt 22$^a$ being adapted to extend a variable distance through an eye 24, integral with or rigidly connected to the brake band section 8$^b$, relative adjustment and sufficiently rigid connection being effected by means of the nuts 25, 26, movable upon the said bolt; additional resilient disengaging means being optionally provided, such as the major spring 27, connected at one end to the mentioned retracting arm 17 and adapted to engage at its other end any one of a plurality of openings 28 in a plate 29, secured at 30 to the angle iron 6, the action of this major spring being optionally supplemented by means such as the minor springs 31 and 32, with which are associated additional positioning means comprising adjustable stops 33 and 34, the former of these being secured at right angles to an inclined plate 35, rigidly secured to the brake band section 8$^a$, and the latter being shown as movable substantially at right angles to said rim section.

From the described construction, it will be obvious that whenever the arm 12 of the main lever is moved by means such as the flexible cord 36 in the direction of the arrow placed adjacent thereto, this application of power will be effective not only to move the respective ends 37 and 38 of the brake band 8 in opposite directions, thereby producing a prompt initial application of my novel brake, but effective also directly to impart a relatively greater movement to the end 37, in the direction of whose engaging movement the wheel 2 may be assumed to be rotating (as indicated by the arrow at the bottom of Figure 1) than to the end 38 of said brake band, moving in opposition to the torque produced by the initial application of my brake, the relative length of the interconnecting arms 18 and 19 of the respective levers referred to being such as to impart a relatively lesser but more powerful movement to the end 38, as required to compensate for the torque effect of the application thereof.

To provide any desired adjustment, I may optionally form the arm 19 of my second lever in two parts having threaded engagement, the outer section of this arm being shown as provided with a substantially spherical knob or head 39 on the end of a threaded rod 40, provided with a lock nut 41, it being indicated by experience that the arm 19 may advantageously have substantially five to ten times the effective length of the arm 18, within which the head 39 is slidably engaged in such manner as to exert relatively great power at or near the completion of a braking movement, and it being understood also, as a matter of the highest practical importance, that a perfect control of the entire braking action is facilitated by the tendency of the drag of the brake band 8, or its lining, in turn to impart movement to the arm 13 of my main braking lever, and thereby a releasing movement also to the end 38 of said brake band, through the described interconnection of the above mentioned levers,—whose effective operation, within a given interval of time, remains a function of the rapidity of rotation of the wheel to which my novel brake may be applied, although self-locking is prevented.

It being understood that a wheel to which my brake is applied may be turned upon a substantially vertical axis, as in the steering of a vehicle by means comprising the spindle arms 42, it is an object of this invention to provide operating means for my brake which shall comprise equalizing means and which shall be capable of operation, irrespective of any movement of a pair of front wheels necessary to the steering of a vehicle. For the purposes referred to, I may provide each of the dust plates 5 with an aperture 43, through which may extend a rigid or transversely flexible tubular element 44, through which the flexible cord 36, or its equivalent, may be conducted to any suitable point, it being preferable that, when the tube 44 is of rigid construction, the upper or inner end of this tube shall be substantially in the axis of the main pivot 45, upon which a front wheel may turn, the described housing or tube 44 being moreover preferably secured in a rigid manner, as by means of clips or plates 46, 47, to the axle 48 of a vehicle; and, in order to permit of an equalizing effect between the two opposite wheels carried by stub axles pivoted to the axle 48, or its equivalent, I may provide means such as the lever plate 49, shown as secured to said axle by means of a link 50, pivoted at 51 to said axle and at 52 to said lever plate, the operating arm 53 of this plate being in turn connected to a brake rod 54, or its equivalent, in such manner that a longitudinal movement of said rod, or its equivalent, shall produce a braking action through the intermediation of the cords 36, or their equivalent, extending through the respective tubular housings 44, the construction here referred to being such that, irrespective of motion directly imparted by means of the operating arm 53 to the lever plate 49, any tension upon one of the flexible cords 36, due to the effective application of the brake connected therewith, must be effective immediately to transmit an equalizing braking action to the brake upon the opposite wheel, substantially as if the respective flexible cords 36 were directly connected.

The chief use of a vehicle brake being ordinarily the stopping or retardation of an advancing car, the herein described form of my brake organization is designed with especial reference to the control of a car moving forward, it being understood that when my novel brake is employed upon a pair of front wheels, any usual or preferred alternative type of brake, which may be equally effective to stop either an advance or a backward movement, may be associated therewith, although I may optionally employ brakes of my improved design upon both the front wheels and the back wheels of a vehicle, and I may either provide them with separate operating means or with interconnecting and equalizing means of the general character herein described.

It is an important merit of the design above illustrated that the relative lengths of the interconnecting levers 18 and 19 may remain very nearly constant during the effective portion of a brake-applying movement in which these levers may pass through "center"; but it should be understood that both my brake-applying and my brake retracting organizations may be varied within comparatively wide limits. For example, although the mentioned minor springs 31 and 32, cooperating with the major springs 22, 27, and supplemented by the action of gravity in tending to withdraw the upper brake band section 8$^b$ from an engaging position, may ordinarily be found entirely adequate, it being understood that the movement of the inclined plate 35 is normally in the direction of the length thereof, I may optionally form the last mentioned plate of resilient material, in order to diminish or obviate the liability to a breakage of this element when my brake shall be suddenly applied to a car moving backward; or I may optionally employ, for the purpose last referred to, the alternative or optional construction suggested in Figure 5, from an inspection of which it will be understood that although the spring 32$^a$ and the adjustable stop 34$^a$ are similar in type to the above mentioned spring 32 and stop 34, the apertured arm 55, rigidly connected with one end of a brake band section 8$^c$ (provided with adjusting means of an obvious construction and comprising a bolt 22$^b$) is intended to be movable in the direction of its length, or at right angles to the bolt or stud 56, supported from a plate 57, although also movable longitudinally or diagonally upon said bolt, within the limits prescribed by resilient means such as the springs 58, 59, threaded onto the bolt or stud 56 and shown as provided with adjustable stops in the form of nuts 60, 61, threaded thereon.

It should be understood that the vitally important features of my invention include not only (1) the general organization by which the torque effect upon a brake band is offset by an inequality in the lengths of operating arms of levers respectively attached to the opposite ends of a brake band, and (2) the avoidance of any self-locking effect, interfering with complete and reliable control, and (3) the advantageous use of flexible brake operating means terminable within brake drums on steering wheels (and other novel features mentioned), but also and especially (4) the providing of interconnected operating means extending to the opposite ends of a brake band and whose relative power shall undergo no substantial change during the period of effective application, and (5) the providing of effective equalizing means, not dependent upon the complete application of a brake and not interconnected in any unfavorable way with steering mechanism, whereby a tractive or braking effect initially obtained upon either one of a pair of wheels may be immediately transmitted to improve the application of an interconnected brake upon an opposite wheel, the greater traction being, however, produced in that wheel which may be revolving, as in the rounding of a corner, at the slower rate of speed.

Although I have herein described one complete embodiment of my invention, suggesting various alternatives in detail, it should be understood that various features of my invention might be independently employed, and also that my invention may be embodied in various additional alternative forms without a departure from the spirit and scope of the same as is indicated by the foregoing description and the following claims.

What I claim is:

1. In a brake comprising a drum secured to a ground wheel and a plate secured to a spindle casting, a pair of levers pivotally mounted relatively to said plate and connected to a brake band and mechanically interconnected by means comprising lever arms of unequal length.

2. In a brake comprising a drum secured to a ground wheel and a plate secured to a spindle casting, a pair of levers pivotally mounted relatively to said plate and mechanically interconnected, one arm of each lever being operatively connected to an adjacent end of a brake band.

3. In a brake comprising a drum secured to a ground wheel and a plate secured to a spindle casting, a pair of levers pivotally mounted relatively to said plate and mechanically interconnected, the first of said levers being provided with an operating arm to which a flexible cord is connected.

4. In a brake comprising a drum secured to a ground wheel and a plate secured to a spindle casting, a pair of levers pivotally mounted relatively to said plate and mechanically interconnected, the first of said levers being provided with an operating arm to which a flexible cord is connected, and provided also with a comparatively short interconnecting arm adapted to engage a comparatively long operating arm upon the second of said levers.

5. In a brake comprising a drum secured to a ground wheel and a plate secured to a spindle casting, a pair of levers pivotally mounted relatively to said plate and mechanically interconnected, the first of said levers being provided with an operating arm to which a flexible cord is connected, and provided also with a comparatively short interconnecting arm adapted to engage a comparatively long operating arm upon the second of said levers by means comprising a rounded head extending within a sleeve.

6. In an interior band brake, a pair of levers connected to opposite ends of a brake band and interconnected by means predetermining a larger relative movement of that end of said brake band which may be advanced in the direction of rotation of a wheel by the initial application of said brake thereto.

7. In a brake system, dust plates carrying band-expanding levers respectively secured to spindle castings, said band-expanding levers being operated by flexible elements respectively surrounded and guided by rigid tubular housings.

8. In a brake system, dust plates carrying band-expanding levers respectively secured to spindle castings, said band expanding levers being operated by flexible elements respectively surrounded and guided by rigid tubular housings terminating in proximity to the respective axes of rotation of said castings.

9. In a brake system, an interior band brake comprising a pair of levers interconnected, the operating arm of a first lever being movable by a flexible element terminating within a brake drum.

10. In a brake system, an interior band brake comprising a pair of levers interconnected, the operating arm of a first lever being movable by a flexible element terminating within a brake drum, said flexible element being mechanically connected with a similar element extending from another brake of like construction.

11. In an interior band brake, a pair of interconnected levers one of which is provided with resilient returning means.

12. In an interior band brake, a pair of levers interconnected by arms whose effective lengths are unequal and variable.

13. In an interior band brake, a pair of levers interconnected by arms whose effective lengths are unequal and variable, the longer of said arms being provided with means for adjustably varying the leverage.

14. In an interior band brake, band-expanding means connected to the opposite ends of a brake band and adapted to move said ends in opposite directions, the more powerful movement being imparted to that end moving in opposition to a torque produced by the engagement of an advancing wheel upon which said brake may be mounted.

15. In an interior band brake, band-expanding means connected to the opposite ends of a brake band and adapted to move said ends in opposite directions, the more powerful movement being imparted to that end moving in opposition to a torque produced by the engagement of an advancing wheel upon which said brake may be mounted, and the ratio of movement between the respective ends referred to being substantially independent of the degree of application of said brake.

16. An interior band brake construction including a band for said brake, and a pair of levers connected to opposite ends of said brake band and being mechanically interconnected by the connecting arm of one lever being comparatively short and the connecting arm of the other lever being comparatively long, whereby said arrangement utilizes the torque produced upon the initial application of said brake in decreasing the expansion of the band of said brake in a manner which prevents locking.

17. In a brake construction, a spindle casting, a dust plate, dust plate supports integral and on opposite sides of said casting, and removable means for securing the dust plate to said supports.

In testimony whereof I have signed my name to this specification.

DONALD MARLEY.